(12) United States Patent
Naito et al.

(10) Patent No.: US 7,446,147 B2
(45) Date of Patent: Nov. 4, 2008

(54) PROPYLENE RESIN COMPOSITION

(75) Inventors: Masamichi Naito, Sodegaura (JP); Ikunori Sakai, Sodegaura (JP); Yoshio Sugimoto, Sodegaura (JP); Kenta Tsubohara, Tokyo (JP)

(73) Assignee: Mitsui Chemicals, Inc., Tokyo (JP)

(*) Notice: Subject to any disclaimer, the term of this patent is extended or adjusted under 35 U.S.C. 154(b) by 250 days.

(21) Appl. No.: 10/558,157

(22) PCT Filed: Nov. 11, 2003

(86) PCT No.: PCT/JP03/14310

§ 371 (c)(1),
(2), (4) Date: Nov. 23, 2005

(87) PCT Pub. No.: WO2004/108824

PCT Pub. Date: Dec. 16, 2004

(65) Prior Publication Data

US 2007/0010622 A1 Jan. 11, 2007

(30) Foreign Application Priority Data

Jun. 6, 2003 (JP) ............................. 2003-161651

(51) Int. Cl.
*C08L 53/00* (2006.01)
(52) U.S. Cl. ...................................................... 525/89
(58) Field of Classification Search .................. 525/89
See application file for complete search history.

(56) References Cited

U.S. PATENT DOCUMENTS 4,960,823 A * 10/1990 Komatsu et al. ............... 525/89
5,837,764 A * 11/1998 Akagawa et al. ............ 524/451
5,883,174 A * 3/1999 Akagawa et al. ............ 524/451

FOREIGN PATENT DOCUMENTS

| JP | 60-184547 A | 9/1985 |
|---|---|---|
| JP | 7-286022 A | 10/1995 |
| JP | 9-176406 A | 7/1997 |
| JP | 9-227735 A | 9/1997 |
| JP | 2000-344978 A | 12/2000 |
| JP | 2002-30196 A | 1/2002 |
| JP | 2002-155188 A | 5/2002 |
| JP | 2003-41088 A | 2/2003 |

\* cited by examiner

*Primary Examiner*—Jeffrey C Mullis
(74) *Attorney, Agent, or Firm*—Birch, Stewart, Kolasch & Birch, LLP

(57) ABSTRACT

A propylene resin composition comprising (A) a crystalline propylene block copolymer in an amount of 89 to 30% by weight, which has a specific content of a 23° C. n-decane-soluble component, said soluble component having a specific intrinsic viscosity [η]a as measured in decalin at 135° C., has a specific melt flow rate (MFR, 230° C., load of 2160 g), and has a specific isotactic pentad fraction of a polypropylene homopolymer portion as measured by $^{13}$C-NMR, (B) a crystalline propylene block copolymer in an amount of 5 to 25% by weight, which has a specific content of a 23° C. n-decane-soluble component, said soluble component having a specific intrinsic viscosity [η]b as measured in decalin at 135° C., has a specific melt flow rate (MFR, 230° C., load of 2160 g), and has a specific isotactic pentad fraction of a polypropylene homopolymer portion as measured by $^{13}$C-NMR, (C) an elastomeric polymer in an amount of 1 to 20% by weight, which has a melt flow rate (MFR, 230C, load of 2160 g) of 0.5 to 30 g/10 min, and (D) an inorganic filler in an amount of 5 to 25% by weight.

2 Claims, No Drawings

PROPYLENE RESIN COMPOSITION

FIELD OF THE INVENTION

The present invention relates to a propylene resin composition capable of providing a molded article that is excellent in mechanical properties, resistance to hue change by light and appearance such as flow mark and weld mark.

BACKGROUND OF THE INVENTION

Polypropylene compositions are used in various fields such as automobile parts, mechanical parts and electrical parts, and to the compositions, various additives are added according to the properties required.

For example, in the field of automobile parts where rigidity and impact resistance are required, a polypropylene composition obtained by incorporating an elastomer and talc in a crystalline propylene block copolymer is used (Japanese Patent Laid/Open Publication No. 30196/2002, etc.).

When the polypropylene composition is used as a material for the automobile parts, a colored molded article is sometimes produced by molding a blend of the composition with a pigment, without conducting painting. Therefore, the composition needs to have not only excellent rigidity and impact strength but also such excellent moldability that the resulting molded article does not have bad appearance such as flow mark. However, any crystalline propylene resin composition satisfying the above requirements has not been obtained.

It is an object of the present invention to provide a propylene resin composition having not only excellent mechanical properties such as high rigidity and high impact resistance but also excellent appearance such as inconspicuous flow mark or weld mark.

DISCLOSURE OF THE INVENTION

The present inventors have studied the above problem, and as a result, have found that the above object can be achieved by adding a specific propylene block copolymer as a crystalline propylene block copolymer. Based on the finding, the present invention has been accomplished.

That is to say, there is provided by the first invention:

a propylene resin composition comprising:

(A) a crystalline propylene block copolymer in an amount of 89 to 30% by weight, which has a 23° C. n-decane-soluble component content of 15 to 35% by weight, said soluble component having an intrinsic viscosity $[\eta]a$, as measured in decalin at 135° C., of not less than 1 dl/g and less than 5 dl/g, has a melt flow rate (MFR, 230° C., load of 2160 g), as measured by the method of ASTM D 1238, of 10 to 150 g/10 min, and has an isotactic pentad fraction of a polypropylene homopolymer portion, as measured by $^{13}$C-NMR, of not less than 0.97, (B) a crystalline propylene block copolymer in an amount of 5 to 25% by weight, which has a 23° C. n-decane-soluble component content of 15 to 35% by weight, said soluble component having an intrinsic viscosity $[\eta]b$, as measured in decalin at 135° C., of 5 to 10 dl/g, has a melt flow rate (MFR, 230° C., load of 2160 g), as measured by the method of ASTM D 1238, of 1 to 35 g/10 min, and has an isotactic pentad fraction of a polypropylene homopolymer portion, as measured by $^{13}$C-NMR, of not less than 0.97, (C) an elastomeric polymer in an amount of 1 to 20% by weight, which has a melt-flow rate (MFR, 230° C., load of 2160 g) of 0.5 to 30 g/10 min, and (D) an inorganic filler in an amount of 5 to 25% by weight, with the proviso that the total amount of the components (A) to (D) is 100% by weight.

There is provided by the second invention:

the propylene resin composition of the first invention, wherein the intrinsic viscosity $[\eta]e$ of the elastomeric polymer (C) and the intrinsic viscosity $[\eta]a$ of the n-decane-soluble component of the crystalline propylene block copolymer (A) have a relationship of the following formula (1):

$$0.5 \leq [\eta]e/[\eta]a \leq 2 \quad (1)$$

PREFERRED EMBODIMENTS OF THE INVENTION

The propylene resin composition according to the present invention is described in detail hereinafter.

(A) Crystalline Propylene Block Copolymer and (B) Crystalline Propylene Block Copolymer The crystalline propylene block copolymer (A) for use in the present invention has, as a whole, a melt flow rate (MFR), as measured at 230° C. under a load of 2.16 kg in accordance with ASTM D 1238, of 20 to 150 g/10 min, preferably 25 to 100 g/10 min.

When the crystalline propylene block copolymer (A) for use in the present invention is subjected to solvent fractionation by the use of n-decane, this resin is fractionated into a component (b-A) that is soluble in n-decane at 23° C. and a component (a-A) that is insoluble in n-decane at 23° C. The content of the component (b-A) that is soluble in n-decane at 23° C. is in the range of 15 to 35% by weight, particularly preferably 17 to 25% by weight, and the content of the component (a-A) that is insoluble in n-decane at 23° C. is in the range of 65 to 85% by weight, particularly preferably 75 to 83% by weight. The isotactic pentad fraction of the polypropylene homopolymer portion, as measured by $^{13}$C-NMR, is not less than 0.97, preferably not less than 0.975, more preferably not less than 0.98.

When the crystalline propylene block copolymer (B) for use in the present invention is subjected to solvent fractionation by the use of n-decane, this resin is fractionated into a component (b-B) that is soluble in n-decane at 23° C. and a component (a-B) that is insoluble in n-decane at 23° C. The content of the component (b-B) that is soluble in n-decane at 23° C. is in the range of 15 to 35% by weight, particularly preferably 17 to 25% by weight, and the content of the component (a-B) that is insoluble in n-decane at 23° C. is in the range of 65 to 85% by weight, particularly preferably 75 to 83% by weight. The isotactic pentad fraction of the polypropylene homopolymer portion, as measured by $^{13}$C-NMR, is not less than 0.97, preferably not less than 0.975, more preferably not less than 0.98.

The n-decane solvent fractionation of the crystalline propylene block copolymer (A) or (B) is carried out in the following manner.

To 500 ml of n-decane at 135° C., 5 g of a polypropylene block copolymer resin sample is added, and they are sufficiently stirred to completely dissolve the soluble component (soluble polymer) in the solvent. Thereafter, the resulting solution was cooled to 23° C. and allowed to stand for 24 hours. Then, the n-decane solution is subjected to centrifugal separation, and the liquid phase separated is decanted into 1000 ml of acetone to precipitate a polymer. The precipitate is filtered, washed and dried to obtain a component (b) that is soluble in n-decane at 23° C. (23° C. n-decane-soluble component (b)). The component other than the 23° C. n-decanesoluble component (b) is regarded as a component (a) that is insoluble in n-decane at 23° C. (23° C. n-decane-insoluble component (a)).

In this specification, the component (a) of the copolymer (A) and the component (a) of the copolymer (B) are referred to as a "component (a-A)" and a "component (a-B)", respectively, and the component (b) of the copolymer (A) and the component (b) of the copolymer (B) are referred to as a "component (b-A)" and a "component (b-B)", respectively.

In the crystalline propylene block copolymer (A) for use in the present invention, the 23° C. n-decane-insoluble component (a-A) preferably consists of only structural units derived from propylene, but it may contain structural units derived from other monomers in a small amount, for example, not more than 10% by mol, preferably not more than 5% by mol. Examples of other monomers include α-olefins other than propylene, such as ethylene, 1-butene, 1-pentene, 1-hexene, 4-methyl-1-pentene, 3-methyl-1-pentene, 1-heptene, 1-octene, 1-nonene, 1-decene and 1-dodecene; vinyl compounds, such as styrene, vinylcyclopentene, vinylcyclohexane and vinylnorbornane; vinyl esters, such as vinyl acetate; unsaturated organic acids or their derivatives, such as maleic anhydride; conjugated dienes; and non-conjugated polyenes, such as dicyclopentadiene, 1,4-hexadiene, dicyclooctadiene, methylenenorbornene and 5-ethylidene-2-norbornene. Of these, ethylene and α-olefins of 4 to 10 carbon atoms are preferable. Two or more kinds of these monomers may be copolymerized.

MFR of the 23° C. n-decane-insoluble component (a-A) of the crystalline propylene block copolymer (A) preferably employable in the present invention is in the range of 10 to 400 g/10 min, preferably 20 to 250 g/10 min.

Although the 23° C. n-decane-soluble component (b-A) is mainly a propylene/α-olefin copolymer portion, it contains a part of a propylene homopolymer, for example, a by-product produced in the polymerization such as a low-molecular weight substance.

The α-olefin of the propylene/α-olefin copolymer for constituing the 23° C. n-decane-soluble component (b-A) is, for example, ethylene and/or an α-olefin of 4 to 12 carbon atoms. Examples of the α-olefins include ethylene, 1-butene, 1-pentene, 1-hexene, 4-methyl-1-pentene, 3-methyl-1-pentene, 1-heptene, 1-octene, 1-nonene, 1-decene and 1-dodecene. Of these, ethylene is preferable.

The 23° C. n-decane-soluble component (b-A) of the crystalline propylene block copolymer (A) for use in the present invention has an intrinsic viscosity ([η]a, in decalin at 135° C.) of not less than 1 dl/g and less than 5 dl/g, preferably 1.5 to 4.0 dl/g.

The 23° C. n-decane-soluble component (b-B) of the crystalline propylene block copolymer (B) has an intrinsic viscosity ([η]b, in decalin at 135° C.) of 5 to 10 dl/g, preferably 6.5 to 9 dl/g.

The crystalline propylene block copolymers (A) and (B) for use in present invention can be prepared by, for example, multistage polymerization in the presence of a catalyst for the preparation of high stereoregular polypropylene. That is to say, the propylene block copolymer for use in the present invention can be prepared by multistage polymerization of two or more steps including a step (first step) of polymerizing propylene substantially in the presence or absence of hydrogen and in the presence of a high stereoregular polymerization catalyst, which comprises (i) a solid titanium catalyst component containing magnesium, titanium, halogen and an electron donor, (ii) an organometallic compound catalyst component and (iii) a donor component, to prepare a propylene homopolymer portion (A-2) or (B-2) in an amount of 65 to 85% by weight based on the whole propylene block copolymer (A) or (B) finally obtained, and a step of copolymerizing propylene and an α-olefin in the presence of the above-mentioned polymerization catalyst to prepare a propylene/α-olefin copolymer portion (b) in an amount of 15 to 35% by weight based on the whole propylene block copolymer (A) or (B) finally obtained. Although the methods to control the molecular weight and the intrinsic viscosity [η] are not specifically restricted, it is preferable to use hydrogen as a molecular weight modifier.

The polymerization in each step can be carried out continuously, batchwise or semi-continuously, but it is preferable to carry out the polymerization continuously. Further, the polymerization can be carried out by a publicly known process, for example, a gas phase polymerization process or a liquid phase polymerization process such as solution polymerization, slurry polymerization or bulk polymerization. In the second step or thereafter, the polymerization is preferably carried out continuously similarly to the previous step. In case of batchwise polymerization, multistage polymerization can be carried out by the use of one polymerization reactor.

As a polymerization medium, an inert hydrocarbon may be used, or liquid propylene may be used. The polymerization conditions in each step are as follows. The polymerization temperature is in the range of about 50 to +200° C., preferably about 20 to 100° C., and the polymerization pressure is in the range of atmospheric pressure to 9.8 MPa (gauge pressure), preferably about 0.2 to 4.9 MPa (gauge pressure).

(C) Elastomeric Polymer

The propylene resin composition of the present invention contains, as a third component, (C) an elastomeric polymer. The elastomeric polymer (C) can be used singly or in combination of two or more kinds.

The elastomeric polymer (C) for use in the present invention is preferably an olefin type elastomer or a styrene type elastomer.

As the olefin type elastomer, an elastomer comprising a copolymer of an α-olefin of 2 to 20 carbon atoms, preferably 2 to 10 carbon atoms, is employable. Examples of the α-olefins include ethylene, propylene, 1-butene, 3-methyl-1-pentene, 4-methyl-1-pentene, 1-hexene, 1-octene, 1-decene, 1-tetradecene and 1-octadecene. These α-olefins are used in combination of two or more kinds. Examples of the olefin type elastomers include ethylene/α-olefin copolymers, such as an ethylene/propylene copolymer, an ethylene/butene copolymer, an ethylene/hexene copolymer, an ethylene/octane copolymer and an ethylene/decene copolymer; a propylene/butene copolymer; and a propylene/butene/ethylene copolymer.

More-specifically, there can be mentioned, as the olefin type elastomers, non-crystalline or low-crystalline α-olefin copolymers containing no diene component, such as an ethylene/propylene copolymer rubber, an ethylene/1-butene copolymer rubber, an ethylene/1-octene copolymer rubber and a propylene/ethylene copolymer rubber; ethylene/propylene/non-conjugated diene copolymer rubbers, such as an ethylene/propylene/dicyclopentadiene copolymer rubber, an ethylene/propylene/1,4-hexadiene copolymer rubber, an ethylene/propylene/cyclooctadiene copolymer rubber, an ethylene/propylene/methylenenorbornene copolymer rubber and an ethylene/propylene/ethylidenenorbornene copolymer rubber; and an ethylene/butadiene copolymer rubber.

The styrene type elastomer preferably contained in the propylene resin composition of the present invention is, for example, an elastomer containing not less than 20% of styrene, such as a styrene/ethylene/butylene/styrene block copolymer (SEBS).

The SEBS is generally known as a hydrogenation product of SBS (styrene/butadiene/styrene block copolymer) that is a styrene/butadiene type block copolymer. In the present invention, SBS and other styrene/conjugated diene copolymers, or their complete or incomplete hydrogenation products may be used together with SEBS.

The SEBS in the present invention is a thermoplastic elastomer consisting of polystyrene block units and polyethylene/butylene rubber block units. In such SEBS, the polystyrene block unit that is a hard segment forms physical crosslinking (domain) and is present as a crosslinking point of a rubber block unit. The rubber block unit present between the polystyrene block units is a soft segment and has elastomeric properties.

In the SEBS used in the present invention, the polystyrene units are desirably contained in amounts of 14 to 40% by mol. The content of units derived from styrene is a value measured by a conventional method such as infrared spectrophotometry or NMR spectrophotometry.

The SEBS desirably has a melt flow rate (MFR, measured at 230° C. under a load of 2.16 kg in accordance with ASTM D 1238) of 0.01 to 100 g/10 min, preferably 0.5 to 30 g/10 min.

Examples of the styrene/non-conjugated diene copolymers include SBR (styrene/butadiene random copolymer), SBS, PS/polyisoprene block copolymer, SIS (styrene/isoprene/styrene block copolymer) and SIS hydrogenation product (SEPS). More specifically, there can be mentioned Kraton (trade name, available from Shell Chemicals), Cariflex TR (trade name, available from Shell Chemicals), Solprene (trade name, available from Phillips Petroleum Co.), Europrene SOL T (trade name, available from Enichem Elastomeri S.r.l.), Tufprene (trade name, available from Asahi Kasei Corporation), Solprene T (trade name, available from Japan Elastomer Co., Ltd.), JSRTR (trade name, available from JSR Corporation), Denka STR (trade name, available from Denki Kagaku Kogyo K.K.), Quintac (trade name, available from Zeon Corporation), Kraton G (trade name, available from Shell Chemicals), Tuftec (trade name, available from Asahi Kasei Corporation), etc.

Examples of the styrene type elastomers referred to in the present invention include the aforesaid SEBS, a styrene/butadiene rubber and its hydrogenation product.

The intrinsic viscosity $[\eta]e$ of the elastomeric polymer (C) and the intrinsic viscosity $[\eta]a$ of the n-decane-soluble component (b-A) of the crystalline propylene block copolymer (A) desirably have a relationship of the following formula (1) because the impact strength of the resin composition tends to be less lowered during the residence in a molten state.

$$0.5 \leq [\eta]e/[\eta]a \leq 2 \quad (1)$$

(D) Inorganic Filler

Examples of the inorganic fillers (D) for use in the present invention include talc, clay, calcium carbonate, mica, silicates, carbonates and glass fibers. Of these, talc and calcium carbonate are preferable, and talc is particularly preferable. Talc having an average particle diameter of 1 to 8 μm, preferably 1 to 5 μm, is desirable. The inorganic fillers (D) may be used singly or in combination of two or more kinds.

Propylene Resin Composition

In the propylene resin composition of the present invention, the proportion of the crystalline block copolymer (A) is in the range of 89 to 30% by weight, preferably 82 to 47% by weight, the proportion of the crystalline block copolymer (B) is in the range of 5 to 25% by weight, preferably 8 to 20% by weight, the proportion of the elastomeric polymer (C) is in the range of 1 to 20% by weight, preferably 2 to 10% by weight, and the proportion of the inorganic filler (D) is in the range of 5 to 25% by weight, preferably 8 to 23% by weight.

In the propylene resin composition of the present invention, additives, such as heat stabilizer, antistatic agent, weathering stabilizer, light stabilizer, anti-aging agent, antioxidant, fatty acid metal salt, softener, dispersant, filler, colorant, lubricant and pigment, may be contained when needed within limits not detrimental to the object of the present invention, in addition to the components (A) to (D).

As the antioxidant, any of phenol type, sulfur type and phosphorus type antioxidants can be added. The antioxidant is desirably added in an amount of 0.01 to 1 part by weight, preferably 0.05 to 0.3 part by weight, based on 100 parts by weight of the total of the crystalline propylene block copolymer (A), the crystalline propylene block copolymer (B) and the elastomeric polymer (C).

The process for preparing the propylene resin composition of the present invention is, for example, a process comprising mixing. the crystalline propylene block copolymer (A), the crystalline propylene block copolymer (B), the elastomeric polymer (C), the inorganic filler (D), and if necessary, additives such as a heat stabilizer by a Henschel mixer, a V-blender, a ribbon blender, a tumbling mixer or the like and then extruding the mixture to obtain pellets of the desired propylene resin composition.

The propylene resin composition of the present invention is excellent in mechanical properties such as rigidity and impact resistance, and besides, it has excellent appearance such as inconspicuous flow mark and weld mark, so that it can be favorably used particularly as a material for automobile parts. Examples of the automobile parts include, as interior trim, instrument panel, glove box, console box, door trim, pillar trim and steering column cover, and as exterior trim, bumper and side mole.

Examples of the present invention are described below. It should be understood that the present invention is in no way limited to those examples as far as they are within the scope of the present invention.

Measurements of the properties of the present invention were made in accordance with the following methods.

Melt Flow Rate

The melt flow rate was measured in accordance with ASTM D 1238.

$[\eta]$ of Polypropylene

An intrinsic viscosity $[\eta]$ measured by dissolving polypropylene in decalin at 135° C. was used.

mmmm Fraction (Isotactic Pentad Fraction)

The isotactic pentad fraction was measured by $^{13}$C-NMR.

Izod Impact Strength (23° C.)

The Izod impact strength-was measured in accordance with ASTM D 256.

Flexural Modulus

The flexural modulus was measured in accordance with ASTM D 790.

Low-Temperature Brittle Point

The low-temperature brittle point was measured in accordance with ASTM D 746.

EXAMPLES

The present invention is further illustrated with reference to the following examples, but it should be construed that the invention is in no way limited to those examples.

Materials used in the examples are as follows.

(a) Propylene block polymer (A1)
MFR (230° C.): 30 g/10 min
23° C. n-decane-soluble component content: 23% by weight
Intrinsic viscosity [η] measured in decalin at 135° C.: 2.5 dl/g
Isotactic pentad fraction of polypropylene homopolymer portion measured by $^{13}$C-NMR: 0.981

(b) Propylene Block Polymer (A2)
MFR (230° C.): 25 g/10 min
23° C. n-decane-soluble component content: 22% by weight
Intrinsic viscosity [η] measured in decalin at 135° C.: 2.3 dl/g
Isotactic pentad fraction of polypropylene homopolymer portion measured by $^{13}$C-NMR: 0.957

(c) Propylene Block Polymer (A3)
MFR (230° C.): 50 g/10 min
23° C. n-decane-soluble component content: 23% by weight
Intrinsic viscosity [η] measured in decalin at 135° C.: 2.5 dl/g
Isotactic pentad fraction of polypropylene homopolymer portion measured by $^{13}$C-NMR: 0.980

(d) Propylene Block Polymer (B)
MFR (230° C.): 11 g/10 min
23° C. n-decane-soluble component content: 23% by weight
Intrinsic viscosity [η] measured in decalin at 135° C.: 7.0 dl/g
Isotactic pentad fraction of polypropylene homopolymer portion measured by $^{13}$C-NMR: 0.980

(e) Elastomeric Polymer (C) Comprising Ethylene and 1-Butene
MFR (190° C.): 4 g/10 min
Density: 0.860 g/cm$^3$ (f) Talc (D)
Particle diameter: 3 μm The components (A), (B), (C) and (D) in the amounts shown in Table 1, 0.1 part by weight of Irganox 1010 (available from Ciba Specialty Chemicals), 0.1 part by weight of Irgafos 168 (available from Ciba Specialty Chemicals) and 0.1 part by weight of calcium stearate were dry blended by a Henschel mixer, then melt kneaded by a twin-screw kneader (TEX 30, manufactured by Japan Steel Works, Ltd.) and pelletized to obtain each composition at 200° C.

Then, from the pellets, a flat plate specimen for flow mark evaluation (thickness: 2 mm), a specimen for flexural strength test (ASTM D 790, thickness: 3.2 mm, length: 127 mm, width: 12.7 mm), a specimen for Izod impact test (ASTM D 256, thickness: 3.2 mm, length: 63.5 mm, width: 12.7 mm) and a specimen for measurement of low-temperature brittle point (ASTM D 746, thickness: 2.0 mm, length: 38.0 mm, width: 6.0 mm) were prepared, respectively by injection molding at a temperature of 200° C. and a mold temperature of 40° C. Using these specimens, flexural test, Izod impact test, measurement of low-temperature brittle point, flow mark evaluation and measurement of melt flow rate were carried out. The results are set forth in Table 1.

TABLE 1

| | Interior trim applications | | | | Exterior trim applications | | |
|---|---|---|---|---|---|---|---|
| | Ex. 1 | Ex. 2 | Comp. Ex. 1 | Comp. Ex. 2 | Ex. 3 | Comp. Ex. 3 | Comp. Ex. 4 |
| Composition | | | | | | | |
| (A1) component (wt. %) | 60 | 65 | 75 | — | — | — | — |
| (A2) component (wt. %) | — | — | — | 60 | — | — | 56 |
| (A3) component (wt. %) | — | — | — | — | 56 | 71 | — |
| (B) component (wt. %) | 15 | 5 | — | 15 | 15 | — | 15 |
| (C) component (wt. %) | 5 | 5 | 5 | 5 | 12 | 12 | 12 |
| (D) component (wt. %) | 20 | 20 | 20 | 20 | 7 | 17 | 17 |
| MFR (g/10 min) | 24 BB | 30 BB | 35 BB | 18 BB | 28 BB | 33 BB | 18 BB |
| Flexural modulus (MPa) | 2100 BB | 2150 BB | 2120 BB | 1840 CC | 1510 BB | 1500 BB | 1350 CC |
| Izod impact strength (23° C., J/m) | 330 BB | 320 BB | 300 BB | 340 BB | 450 ≦ BB | 450 ≦ BB | 450 ≦ BB |
| Low-temperature brittle point (° C.) | −3 BB | −5 BB | −3 BB | −5 BB | −30 BB | −26 BB | −32 BB |

TABLE 1-continued

| | Interior trim applications | | | | Exterior trim applications | | |
|---|---|---|---|---|---|---|---|
| | Ex. 1 | Ex. 2 | Comp. Ex. 1 | Comp. Ex. 2 | Ex. 3 | Comp. Ex. 3 | Comp. Ex. 4 |
| Flow mark appearance | AA | BB | CC | BB | AA | CC | BB |
| Overall evaluation | AA | BB | CC | CC | AA | CC | CC |

AA; very good,
BB; good,
CC; bad

Example 1 and Example 2 exhibited excellent mechanical properties and excellent appearance regarding flow mark (flow mark appearance) when used as a material for automobile interior trim, and Example 3 exhibited excellent mechanical properties and excellent flow mark appearance when used as a material for automobile exterior trim. Of these, Example 1 and Example 3 exhibited particularly excellent appearance. On the other hand, Comparative Example 1 and Comparative Example 3 exhibited bad flow mark appearance although they had good mechanical properties. Comparative Example 2 and Comparative Example 4 exhibited low flexural modulus.

For the above reasons, the compositions of Comparative Examples 1 to 4 are each unsuitable as a material for automobile parts.

INDUSTRIAL APPLICABILITY

The propylene resin composition of the present invention is excellent in mechanical properties such as rigidity and impact resistance, and besides, it has excellent appearance such as inconspicuous flow mark or weld mark. Hence, the propylene resin composition of the present invention can be favorably used particularly as a material for automobile parts, and its industrial value is high.

What is claimed is:

1. A propylene resin composition comprising:
   (A) a crystalline propylene block copolymer in an amount of 89 to 30% by weight, which has a 23° C. n-decane-soluble component content of 22 to 35% by weight, said soluble component having an intrinsic viscosity [η]a, as measured in decalin at 135° C., of not less than 1 dl/g and less than 5 dl/g, has a melt flow rate (MFR, 230° C, load of 2160 g), as measured by the method of ASTM D 1238, of 10 to 150 g/10 min, and has an isotactic pentad fraction of a polypropylene homopolymer portion, as measured by $^{13}$C-NMR, of not less than 0.97,
   (B) a crystalline propylene block copolymer in an amount of 5 to 25% by weight, which has a 23° C. n-decane-soluble component content of 23 to 35% by weight, said soluble component having an intrinsic viscosity [η]b, as measured in decalin at 135° C., of 5 to 10 dl/g, has a melt flow rate (MFR, 230° C., load of 2160 g), as measured by the method of ASTM D 1238, of 1 to 35 g/10 min, and has an isotactic pentad fraction of a polypropylene homopolymer portion, as measured by $^{13}$C-NMR, of not less than 0.97,
   (C) an elastomeric polymer in an amount of 1 to 20% by weight which has a melt flow rate (MFR, 230° C., load of 2160 g) of 0.5 to 30 g/10 min, and
   (D) an inorganic filler in an amount of 5 to 25% by weight, with the proviso that the total amount of the components (A) to (D) is 100% by weight.

2. The propylene resin composition as claimed in claim 1, wherein the intrinsic viscosity [η]e of The elastomerie polymer (C) and the intrinsic viscosity [η]a of the n-decane-soluble component of the crystalline propylene block copolymer (A) have a relationship of the following formula (1):

$$0.5 \leq [\eta]e/[\eta]a \leq 2 \qquad (1).$$

* * * * *